(12) United States Patent
Lorentz

(10) Patent No.: US 6,189,562 B1
(45) Date of Patent: Feb. 20, 2001

(54) OVERFLOW VALVE

(76) Inventor: Bernt Lorentz, Grosser Ring 9, D-22457 Hamburg (DE)

( * ) Notice: Under 35 U.S.C. 154(b), the term of this patent shall be extended for 0 days.

(21) Appl. No.: 09/486,683

(22) Filed: May 19, 2000

(30) Foreign Application Priority Data

Sep. 10, 1997 (DE) ............................................ 297 16 274 U

(51) Int. Cl.⁷ ................................................. F16K 17/20
(52) U.S. Cl. .......................................... 137/469; 137/472
(58) Field of Search ...................... 137/469, 472

(56) References Cited

U.S. PATENT DOCUMENTS

| 3,769,997 | 11/1973 | Hardwick et al. | |
|---|---|---|---|
| 4,489,697 | * 12/1984 | Kawatei | 123/502 |
| 4,620,562 | 11/1986 | Pacht | |
| 5,165,444 | * 11/1992 | Dean | 137/469 |
| 5,623,962 | * 4/1997 | Danzy et al. | 137/469 |

FOREIGN PATENT DOCUMENTS

| 680573 | 8/1939 | (DE) |
| 886990 | 8/1953 | (DE) |
| 7223233 | 2/1974 | (DE) |
| 3514619 | 10/1986 | (DE) |
| 1135029 | 4/1957 | (FR) |
| 2161250 | 1/1986 | (GB) |

OTHER PUBLICATIONS

Patent Abstracts of Japan, VO. 010, No. 176 (M–491), Jun. 20, 1986 & JP 61 024885 A (Toshiba Mach Co Ltd), Feb. 3, 1986.

* cited by examiner

Primary Examiner—A. Michael Chambers
Assistant Examiner—Thomas L. McShane
(74) Attorney, Agent, or Firm—Friedrich Kueffner

(57) ABSTRACT

For operating pumps above the respective system resistance for all volume flows, for a spring-loaded, directly acting overflow valve for limiting the pressure in a system in which a liquid is lifted by a positive-displacement pump and flows through the system with varying rates of flow, the valve chamber (1) and the valve body (22) with the valve head (14) placed therein are constituted in such a way that the valve head, after lifting off from the valve seat (3), has a second active diameter which is bigger than the first active diameter, whereby the valve head (11) simultaneously releases, with increasing stroke of the valve body (22), an enlarging flowing-through cross section, whereby the valve body (22) is constituted in one part as a valve piston (11) sliding in the valve chamber (1) with a third active diameter which is bigger than the second active diameter so that the liquid flowing through the valve chamber (1), the valve being opened, produces a pressure difference which acts onto the valve piston (11) against the action of the first spring (21).

9 Claims, 3 Drawing Sheets

OVERFLOW VALVE

FIELD OF APPLICATION

This invention relates to the field of valve technique. It concerns an overflow valve for limiting the pressure in a system in which a liquid is lifted by a positive-displacement pump and flows through the system with varying rates of flow, comprising a valve chamber with an inlet opening bordered by a valve seat for the entry of liquid into the valve chamber and with at least one outlet opening in connection with the runback to the positive-displacement pump for the outlet of the liquid out of the valve chamber, as well as a valve body placed displaceable inside the valve chamber with a valve head, whereby the valve body is pressed by a first spring with the valve head sealing against the valve seat and is lifted off from the valve seat at an opening pressure determined by a first active diameter of the valve head against the force of the first spring and opens the inlet opening.

PRIOR ART

A great number of pump systems with positive-displacement pumps for the lifing of liquids are operated with different rates of flow from the nominal power or maximal power over different throttle states up to the rate of flow zero. Directly acting spring-loaded pressure control valves or overflow valves are used for avoiding an over-stressing of the driving gear, for limiting the system pressure and for limiting the volume flow.

Because of the spring power increasing with the opening stroke, these valves cause, after the beginning of the opening, an overflow pressure which is also increasing. This is counteracted in known embodiments, after the beginning of the opening of the valves, by bigger valve surfaces which then become active so that the rise of pressure is reduced or even a decrease of pressure is achieved. Here, the stabilization of the pressure at each operating state raises difficulties. It is known to use hydraulic damping cylinders for stabilizing which then however prevent a quick valve reaction by sudden resistance changes in the system, for example by shutting-off operations, and thus cause undesirable pressure peaks.

For a better understanding of the problems, the widespread operating of gasoline pumps for refueling vehicles can be taken as an example. The pump unit is activated with the removal of the dispensing valve from the Support, and the fuel flows over the overflow valve with a pressure slightly higher than the refueling pressure, the driving energy necessary for this approximately corresponding to the energy demand when refueling. This state has a varying duration.

During the refueling with a fully opened dispensing valve, i.e. with a maximal volume flow and operating pressure and with the use of a gasoline pump which is constructed quite precisely for this capacity, there do not result any problems. However, overdimensioned pumps are very often used in order to cause during the operation already a partial opening of the overflow valve. Due to this measure, the pressure peaks triggered by quick closing dispensing valves should be reduced. This causes a higher energy consumption.

Furthermore, two snap-in positions for the throttled refueling are generally provided on the dispensing valves for the opening lever. Here, the pump is operated with the maximal pressure in connection with the used overflow valves. This pressure encounters a relatively low decrease of pressure, because of the throttled volume flow, so that an unnecessarily high pressure prevails ahead of the dispensing valve. In spite of a low rate of refueling, however with an almost unchanged pump pressure, the energy consumption is unchanged, compared with the throttled refueling, and thus unnecessarily high.

Moreover, for the throttled refueling operations, the high pressure existing at the dispensing valve requires very high throttle cross sections. This causes high rates of low in the dispensing valve which unfavourably result in foam formation and stronger gas evolution in the tank of the vehicle.

Upon the end of the refueling by manual or automatic turning off of the dispensing valve, the same pressure and energy state as before the beginning of the effective refueling is repeated and lasts until the dispensing valve is hung up again into the gasoline pump. Statistical investigations on gasoline pumps have shown that the pump operating time before and after the actual refueling constitutes approximately 30% of the total pump operating time, i.e. represents a great potential of needless lost energy.

A further illustrating field of application of a big range of application relates to heating pumps which are used with liquid as heat transfer media for the heat transport very often to different consumers, for example to heating radiators. The heat demand is variable for different reasons and is adapted to the consumers, for example through thermostatic valves and/or for the whole system by control of the number of revolutions of the pump. With the adaptation of the heat demand, for example only over thermostatic valves, the pressure increases with increasing throttling for the centrifugal pumps commonly used for heating, and undesirable noises arise then because of the pressure differences at the valves which are then big. The energy consumption is getting lower for centrifugal pumps with increasing throttling.

Speed controlled/frequency controlled pump driving gears are used for reducing the pressure and the energy consumption. However, a part of the saved driving energy is lost again due to the frequency control. The use of positive-displacement pumps with a higher efficiency than centrifugal pumps and with a pressure/volume flow lifting characteristic curve almost along the pressure/volume flow resistance characteristic curve of the system would be a considerable improvement with respect to the functional and energy technique compared with the prior art.

A discharge and/or overflow valve, especially for spray guns, is known by DE-U-72 23 233, valve which comprises a hollow valve chamber with an inlet and an outlet which are connected with an inner working room in the valve chamber, a piston slidingly guided in the working room, whereby the valve chamber shows a valve slit, the cross section of which is smaller than the cross section of the piston and which surrounds the inlet, whereby the piston has a section with a smaller diameter which cooperates with the valve seat in order to interrupt the flowing through of a fluid through the valve chamber, the valve chamber having a channel which connects the room between the valve seat and the piston, when the piston is lifted off from the valve seat, with the outlet of the valve chamber, an adjustable device for varying the passage cross section of the channel, a spring placed between the piston and an abutment in the valve chamber for applying a closing pressure onto the piston, and al device which makes it possible to adjust the power applied by the spring so as to vary the force of pressure which must come to effect in the inlet in order to lift off the piston from the valve seat. This should create a discharge valve under spring tension which is so configured that it quickly reduces the operating pressure of the pump installation, as soon as the operation of the spray gun is interrupted. This known valve has a second bigger active diameter. After the valve disk is lifted off from the valve seat when an opening pressure determined by the spring is exceeded, the lower overflow pressure is determined by the piston. Since this by itself causes an unstable state of the valve piston and thus of the overflow valve, the overflowing liquid is guided over a second adjustable valve cross section to the outlet. For each operating state, determined by the volume flow of the pump and the necessary operating pressure for the spray gun, an adjustment of the spring and of the second valve cross section adapted to each other must take place to avoid pressure instability when overflowing. The valve is thus appropriate for overflowing with a stable pressure only by a constant adjusted operating condition and also only by interruption of the fluid flow (complete locking). A stability of the lowered pressure and an adaptation of the measure of the lowering to variable throttled operating states cannot be achieved with this valve construction.

A spring-loaded pressure control valve with a plunger piston and an overflow pipe is known by DE-A-886 990. This pressure control valve is controlled by a plunger piston, which also controls an overflow pipe, and is particularly appropriate for mazout burners. One or several grooves are installed in the piston skirt of the plunger piston or in the guiding cylinder of the plunger piston, these grooves extending at least approximately in direction of the axis of the plunger piston and having a variable cross section which is at the smallest at its end situated next to the runback opening of the liquid to the store tank and at the biggest at its other end so that these grooves which serve for the overflow constitute a passage with progressively varying cross section for the part of the liquid which returns to the store tank. This valve has with the plunger piston, the outer diameter of which is equal to the angle diameter of the valve seat, in connection with the bore hole, for a corresponding dimensioning thereof, a damping effect which is reinforced by the long-stroke cross section enlargement through the grooves. The overflow pressure is not decreasing but on the contrary increasing in accordance with the spring characteristic curve.

An overflow valve for rotating piston liquid pumps with a springloaded shut-off piston is known by DE 680 573. The shut-off piston shows a annular ring surface which increases the effective valve seat surface over its valve seat, whereby the shut-off piston is guided in a replaceable cylindrical ring body with passage openings which become strongly wider when the piston stroke is increasing, the banking-up pressure which influences the annular ring surface being still additionally influenced by a further throttle organ known per se. This valve has a second bigger active diameter, a second variable stroke depending valve cross section and a third adjustable valve cross section placed outside, but does not have any third active diameter. Due to this arrangemnet, the considerable rise of pressure existing for conventional overflow valves after the beginning of the opening should be reduced and maintained constant, eliminated. A decrease of pressure for all volume flows through the overflow valve up to the proximity of the system characteristic curve is neither intended with this valve construction, nor can it be achieved.
Aim, solution. advantage The aim of this invention is to create a spring-loaded and directly acting overflow valve of the type mentioned above which allows to operate the pump for all volume flows with a pressure only slightly over the respective system resistance and to maintain stable the pressure which is respectively necessary.

Besides the energy saving mode of operation, other functional advantages should also be reached.

This aim is achieved by the characteristics indicated in claim 1.

Accordingly, the overflow valve is configured such that the valve chamber and the valve body with the valve head which is placed in this chamber are constructed in such a way that the valve head has, after the lifting-off from the valve seat, a second active diameter which is bigger than the first active diameter. The valve head releases with each bigger stroke of the valve body simultaneously an increasing flowing-through cross section, whereby the valve body comprises a valve piston sliding in the valve chamber with a third active diameter which is bigger than the second active diameter. When the valve is opened, the liquid flowing through the valve chamber is throttled before entering into the runback, a pressure difference being generated which acts onto the valve piston against the action of the first spring.

An overflow valve with such a configuration has the following advantages.

By a use with a gasoline pump, the energy consumption with this overflow valve would be more than less by half during the time in which, when refueling, the fuel flows over the overflow valve with a pressure slightly over the refueling pressure.

As already mentioned at the beginning, pumps with an overdimensioned volume flow are used very often to cause during the operation already a partial opening of the overflow valve. Due to this measure, the pressure peaks triggered by quickly closing dispensing valves should be reduced. This results in a higher energy consumption. This energy saving measure is unnecessary for an overflow valve according to the invention.

For a conventional gasoline pump, the refueling being throttled, the energy consumption is practically unchanged, compared with the unthrottled refueling. For an overflow valve according to the invention, an energy saving takes place for these throttled refueling operations due to the decrease of pressure.

For a conventional gasoline pump, very small throttle cross sections in the dispensing valve result in high rates of flow which defavourably result in foam formation and stronger gas evolution in the tank of the vehicle. An overflow valve according to the invention allows bigger throttle cross sections on the dispensing valve with then lower flowing-through rates and thus avoids the disadvantages mentioned above.

After a first manual or automatic turning-off of the dispensing valve at the end of the refueling, a subsequent refueling dosed by manual throttling often takes places, an overflow valve according to the invention lowering the pressure and thus being energy saving. Here, the lowered pressure is also a further practical advantage, the refueling being throttled, since a controlled subsequent refueling which reduces the risk of overflowing is possible and the lower pressure difference at the throttled dispensing valve moreover results in lower outgoing speeds and the disadavantageous foam formation and stronger gas evolution in the fuel tank is thus reduced or eliminated.

The worldwide used dispensing valves, and these are only a few manufactures, start, for determining the snap-in positions for the throttled refueling, from overflow valves with an overflow pressure approximately constant and lying in the range of the maximal operating pressure. Therefore, for a combination of these unchanged dispensing valves with overflow valves according to the invention, a lower decrease of pressure must take place during the throttled refueling and, only at the end of the refueling, the full decrease of pressure. The overflow characteristic curve of the overflow valve according to the invention can be adapted to this requirement.

For heating systems, a system adapted pressure/volume flow characteristic line can be produced with an overflow valve according to the invention in combination with a positive displacement pump with relatively low expenditure and without a driving gear controlled by the number of revolutions. For installations with a higher volume flow and a big volume flow range to be regulated, the combination of the overflow valve according to the invention with a driving gear controlled by the number of revolutions is a construction which considerably enlarges the possibilities of use, which also constitutes a considerable improvement with respect to the functional and energy technique compared with the prior art.

A first preferred embodiment of the overflow valve according to the invention is characterized in that the valve seat is configured as a ring-shaped valve seat, orientated to the inside, that the valve head presses, with a valve disk with a bigger diameter than the valve seat, sealing onto the valve seat and that the valve chamber is constituted in the stroke area of the valve disk with an inner diameter which is getting bigger in the stroke direction. A particularly advantageous characteristic curve of the pressure and of the volume flow of the valve is thus obtained.

A second preferred embodiment of the overflow valve according to the invention is characterized in that the valve head is provided with an extension acting as throttling nose, placed in flowing-through direction in front of the valve seat, which releases in the first part of the opening stroke a flowing-through cross section which is only small and which is enlarging. Due to the extension, the pressure and the volume flow are maintained stable when opening the valve, even for a very small volume flow through the valve.

According to a further preferred embodiment of the overflow valve according to the invention, the valve piston closes with the side turned away from the valve head inside the valve chamber a cylinder room, variable with the valve stroke, which is connected with the runback by a first connecting channel with a small cross section. Thus, bigger oscillations of the valve piston are efficiently hydraulically attenuated.

A further preferred embodiment of the overflow valve according to the invention is characterized in that the valve body is made of several parts and comprises besides the valve head a separate valve piston sliding in the valve chamber, that the first spring charges the valve piston, that the valve head and the valve piston are movable relatively to each other in the stroke direction, are spaced from each other in the closed state and are tensioned against each other by a second spring and that both springs are so constructed that the opening pressure for opening the valve against the pressure of the second spring is the same or is bigger than the opening pressure for opening the valve against the pressure of the first spring. Short pressure peaks can thus efficiently be made harmless in the hydraulic system.

Further advantageous configurations of the invention are subject of the sub claims.

SHORT DESCRIPTION OF THE DRAWINGS

The invention will be explained in detail below with reference to the attached drawings.

DETAILED DESCRIPTION OF THE INVENTION AND BEST WAY FOR CARRYING OUT THE INVENTION

Figure 1:
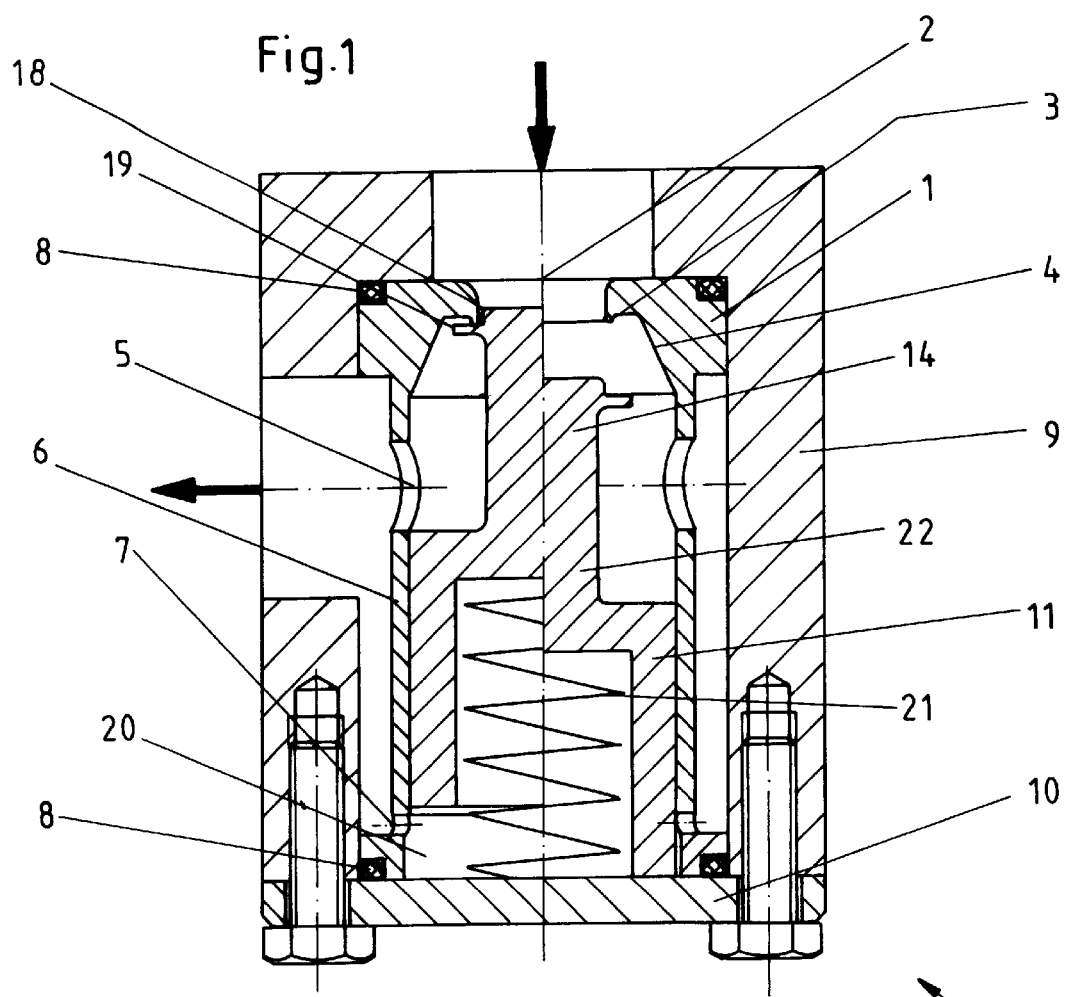
FIG. 1 shows a longitudinal section of a first preferred embodiment of an overflow valve according to the invention with a valve body made of one piece.

The overflow valve according to the invention 100 is represented in FIG. 1 in a preferred embodiment as a built-in unit. The valve chamber 1 with an inlet opening 2 on the delivery side, a valve seat 3, a conical turning out 4, outlet openings or bores 5 guided to the low pressure side or to the runback, a cylinder bore 6, a connecting channel 7 between a cylinder room 20 and the low pressure side is mounted sealing with 0-rings 8 in a casing 9 with a closing cover 10.

A valve body 22 which comprises a valve head 14 and a valve piston 11 is movably positioned in the valve chamber 1. The valve piston 11 is set easy running in the cylinder bore 6 and is pressed by a first spring 21 against with the valve head 14 against the valve seat 3. The valve head 14 has a much bigger valve disk 19 on the bearing surface to the valve seat 3 and an extension 18 penetrating into the inlet opening 2 in form of a throttle installation which releases, after the beginning of the opening motion, at the beginning only a small passage cross section which then widens.

When exceeding the differential pressure predetermined by the first spring 21 on the active surface of the valve seat 3, the overflow valve 100 begins to open. Due to the extension 18, the pressure and the volume flow are maintained stable by the valve, even for a very small volume flow, since oscillations of the valve piston 11 result in only very small changes of the passage cross section. Bigger oscillations of the valve piston 11 are hydraulically attenuated by the cylinder room 20 constituted with the valve chamber 1 in cooperation with the small cross section of the connection 7.

Figure 2:
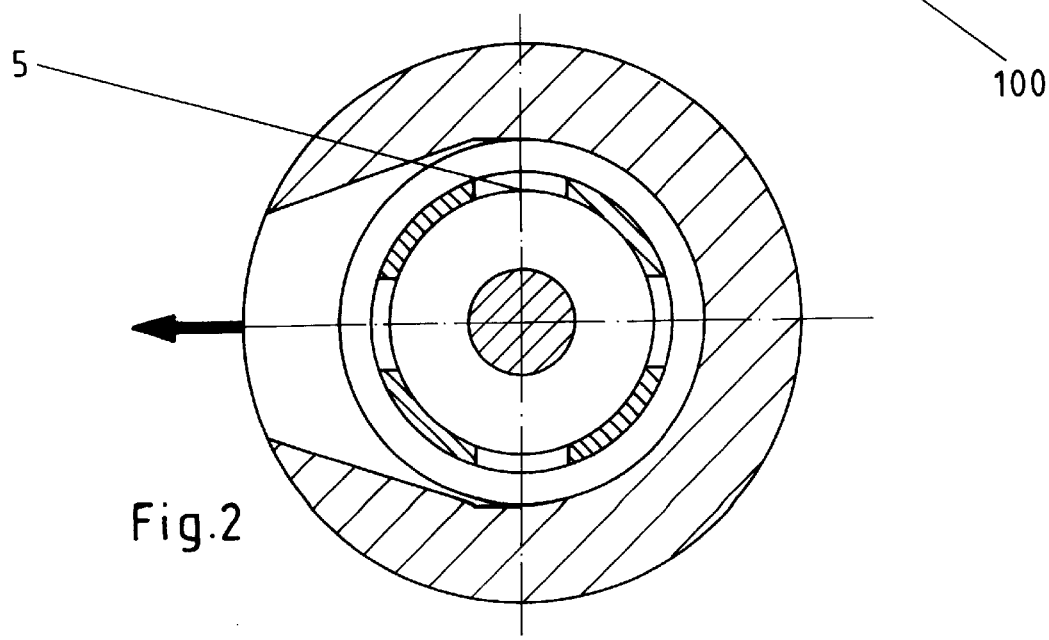
FIG. 2 shows a cross section through the valve according to FIG. 1 at the level of the outlet openings.

When the opening of the valve increases and with the then increasing volume flow through the valve, the valve disk 19 becomes progressively active as opening force in connection with the turning out 4 and thus not only the increase of power of the first spring 21 is compensated but also a decrease of power is caused. By a further increasing of the overflow quantity up to the complete turning off of the flow in the system, an increasing pressure difference is generated by the outlet openings 5 which are placed distributed on the periphery of the valve chamber 1 according to FIG. 2, this pressure difference moving the valve piston 11 over the big surface of the valve piston up to the stopper against the closing cover 10.

Figure 4:
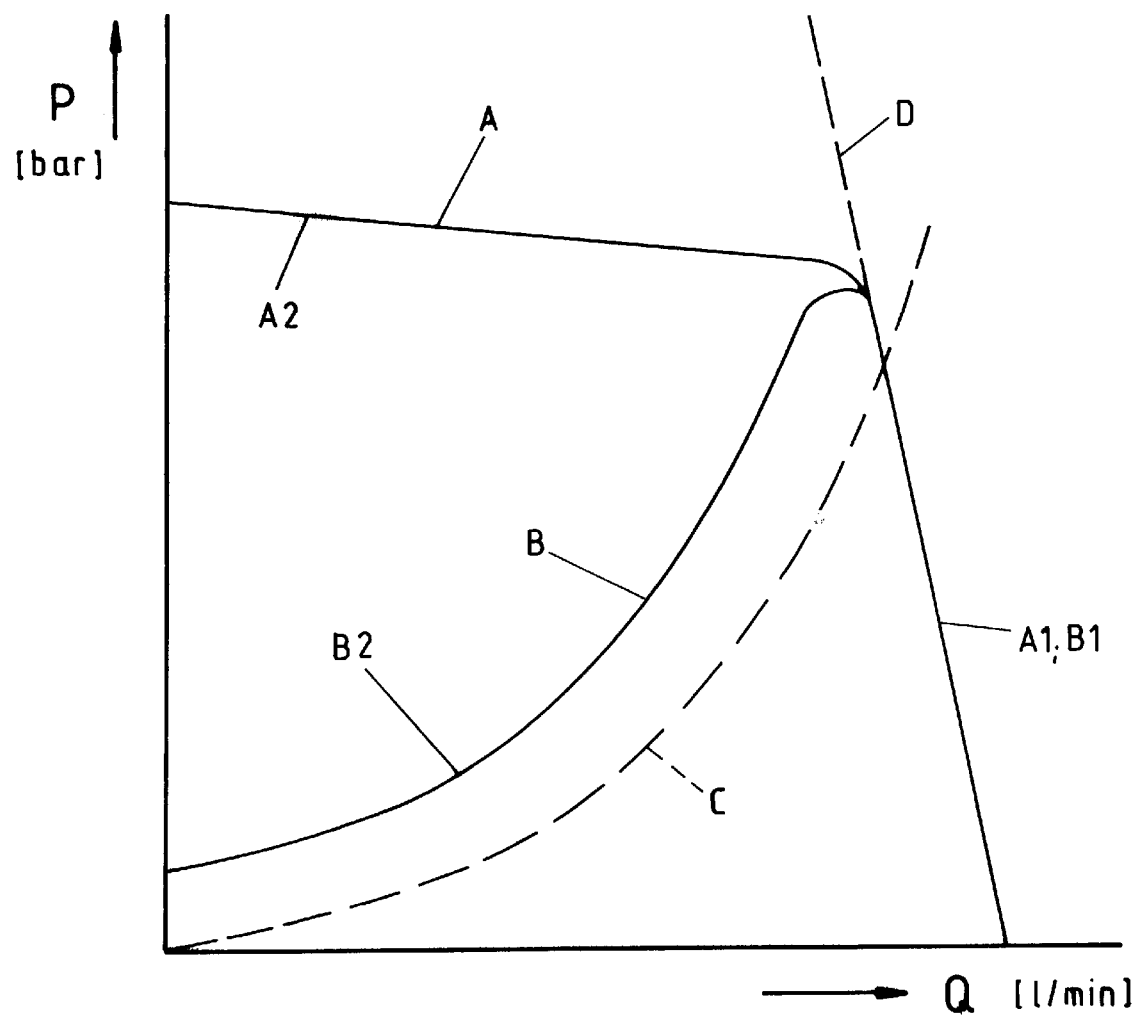
FIG. 4 shows a comparison of characteristic curves (pressure P in bar over volume flow Q in l/min) of a conventional overflow valve (A, A1, A2) and of an overflow valve according to the invention (B, B1, B2 and C of the characteristic curve of a system).

Thus, according to FIG. 4, a valve characteristic curve B is produced which is the same as the characteristic curve A or A1 of a conventional valve in a first section B1 and which runs along the pump characteristic curve D but which strongly decreases, after opening of the valve, in a second section B2 as opposed to the almost horizontal characteristic curve section A2 of a conventional valve and which thus runs above and parallel to the characteristic curve C of the system resistance. The first part of the decreasing pressure curve B2 is primarily caused by the valve disk 19 in connection with the turning out 4, the second part primarily by the actuating power generated by the pressure difference on the valve piston 11.

The adaptation in measure of the diameter of the valve disk 19, the contour of the turning out 4, of the outlet openings 5 and of the diameter of the valve piston 11 in the cylinder bore 6 to the diameter of the valve seat 3 allows., with very low expenditure, the adaptation at a very large extent of the overflow curve pressure P/volume flow Q to application-specific requirements and thus an optimal energy efficient operation.

Figure 3:
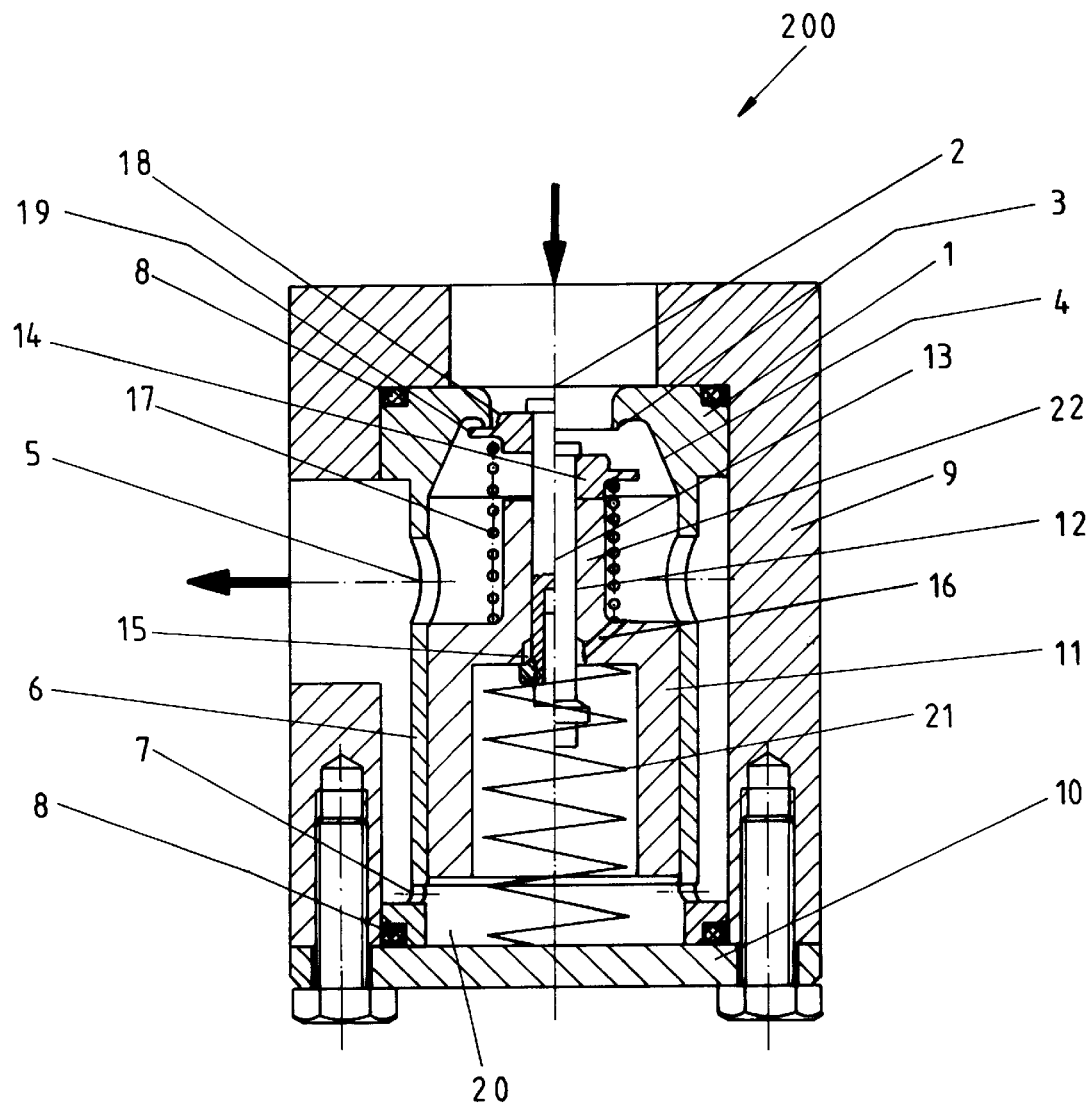
FIG. 3 shows a second preferred embodiment of an overflow valve, in a representation comparable with that of FIG. 1, with a spring-coupled valve body made of two pieces to make pressure peaks harmful.

In FIG. 3, in a further embodiment, an overflow valve 200 is represented by maintaining the function characteristics mentioned above with a two-piece valve body 22 for reducing pressure peaks by quick turning-off operations and by quick starting operations against a locked system. The same parts have the same reference numerals as in FIG. 1.

The valve piston contains here easy-running fitted in a central bore 12 a guiding rod 13 for the valve head 14 with the extension 18 and the valve disk 19. The other end of the guiding rod 13 has a conical sealing nipple 15 which seals through a second spring 17 a connecting channel 16 of the two spring rooms. The prestress power of the second spring 17 corresponds to a differential pressure p1 and the first spring to a differential pressure p2, both related to the active diameter of the valve seat 3. The pressure p2 will be fixed according to requirements specific to the installation and the pressure p1 will be set higher.

During a quick locking and starting process, the pressure p1 will be exceeded and the combination of the valve head 14 and of the guiding rod 13, which is laid down with a low mass, opens undamped very quickly and maximal up to the stopper against the valve piston 11. Immediately after the beginning of the opening, the connecting channel 16 will open in order to avoid a harmful attenuation of the stroke motion by the displacement volume of the guiding rod 13.

Due to the surface of the valve disk which becomes increasingly active with the increasing flow, a force reinforcing and thus accelerating effect takes place onto the opening stroke. Due to the opening of the connecting channel 16, the hydraulic attenuation of the valve piston motion is neutralized to a very large extent by the connecting channel 7, and the valve piston 11 is also at least slightly moved during the quick opening of the valve head 14, which contributes to a further reduction of the pressure peak.

Immediately after relief of the pressure peak, the valve head 14 will be pressed again in its end position by the second spring 17 and the connecting channel 16 will be closed by the conical sealing nipple 15. Thus, the valve piston 11 is again rigidly connected with the valve head 14 and functionally corresponds to the embodiment according to FIG. 1.

The hydraulic attenuation and thus the stabilization of the movable valve body 22 in any intermediate position is only effective when the piston room of the second spring 21 is free from gaseous inclusions. For the preferable vertical mounting of the valve and for the starting of a system which is not filled with liquid, the aeration of the piston room automatically takes place with the first quick starting or locking operations over the connecting channel 16. The maximal stroke of the combination 13/14 will be so dimensioned that the full pumping capacity can overflow with an admissible pressure even for a valve piston 11 which is not moved.

LIST OF REFERENCE NUMERALS 100, 200 overflow valve
1 valve chamber
2 inlet opening (valve chamber)
3 valve seat
4 turning out (conical)
5 outlet opening (valve chamber)
6 cylinder bore
7 connecting channel
8 0-ring
9 casing
10 closing cover
11 valve piston
12 bore (valve piston)
13 guiding rod
14 valve head
15 conical sealing nipple
16 connecting channel
17 spring
18 extension (valve head)
19 valve disk (valve head)
20 cylinder room
21 spring
22 valve body

What is claimed is:

1. An overflow valve (100, 200) for limiting the pressure in a system in which a liquid is lifted by a positive-displacement pump and flows through the system with varying rates of flow, comprising a valve chamber (1) with an inlet opening bordered by a valve seat (3) for the entry of liquid into the valve chamber (1) and with at least one outlet opening (5) in connection with the runback to the positive-displacement pump for the outlet of the liquid out of the valve chamber (1), as well as a valve body (22) placed displaceable inside the valve chamber (1) with a valve head (14), whereby the valve body (22) is pressed with a valve body (14) by a first spring (21) sealing against the valve seat (3) and is lifted off from the valve seat (3) at an opening pressure of the liquid determined by a first active diameter of the valve head (14) against the force of the first spring (21) and opens the inlet opening (2), wherein that the valve chamber (1) with an extension (4) turned to the inlet opening (2) on the delivery side and enlarging in direction of the spring (21) and the valve body (22) with the valve head (14) placed in the valve chamber are constituted so that the valve head, after lifting off from the valve seat (3), has a second active diameter with a preceding retaining room, the second active diameter being bigger than the first active diameter, and whereby the valve head (11) simultaneously releases, with increasing stroke of the valve body (22), an enlarging flowing-through cross section, that the valve body (22) is constituted in one part as a valve piston (11) sliding in the valve chamber (1) with a third active diameter with a preceding retaining room, the third active diameter being bigger than the second active diameter, and that the liquid flowing through the valve chamber (1), the valve being opened, produces a pressure difference which acts onto the valve piston (11) against the action of the first spring (21).

2. An overflow valve according to claim 1, wherein that the valve seat (3) is configured as a ring-shaped valve seat, orientated to the inside, that the valve head (14) presses, with a valve disk (19) with a bigger diameter than the valve seat (3), sealing onto the valve seat (3) and that the valve chamber (1) is configured in the stroke area of the valve disk (19) with an inner diameter which is getting bigger in the stroke direction.

3. An overflow valve according to claim 1, wherein that the valve head (14) is provided with an extension (18) acting as throttling nose, placed in flowing-through direction in front of the valve seat (3), which releases in the first part of the opening stroke a flowing-through cross section which is only small and which is enlarging.

4. An overflow valve according to claim 1, wherein that the valve piston (11) closes with the side turned away from the valve head (14) inside the valve chamber (1) a cylinder room (20), variable with the valve stroke, which is connected with the runback by a first connecting channel with a small cross section.

5. An overflow valve according to claim 1, wherein that the throttling of the liquid flow is carried out through the outlet opening (5) which at least exists which is placed as a bore between the valve head (14) and the valve piston (11) in the valve chamber (1).

6. An overflow valve according claim 1, wherein that the valve body (22) is made of one part.

7. An overflow valve according to 1, wherein that the valve body 822) is made of several parts and comprises, besides the valve head (14), a separate valve piston (11) sliding in the valve chamber (1), that the first spring (21) charges the valve piston (11) and that the valve head (14) and the valve piston (11) are movable relatively to each other in the stroke direction, are spaced from each other in the closed state of the valve and are tensioned against each other by a second spring (17).

8. An overflow valve according to claim 7, wherein that both springs (17, 21) are so constructed that the opening pressure for opening the valve against the pressure of the second spring (17) is the same or is bigger than the opening pressure for opening the valve against the pressure of the first spring (21).

9. An overflow valve according to claim 8, wherein that the valve piston (11) closes with the side turned away from the valve head (14) inside the valve chamber (1) a cylinder room (20) variable with the valve stroke and that means (12, 13, 15, 16) are provided through which, for a relative motion of the valve head (14) to the valve piston (11), a connection (16) between the cylinder room (20) and the runback will be released.

* * * * *